United States Patent Office 3,158,743
Patented Nov. 24, 1964

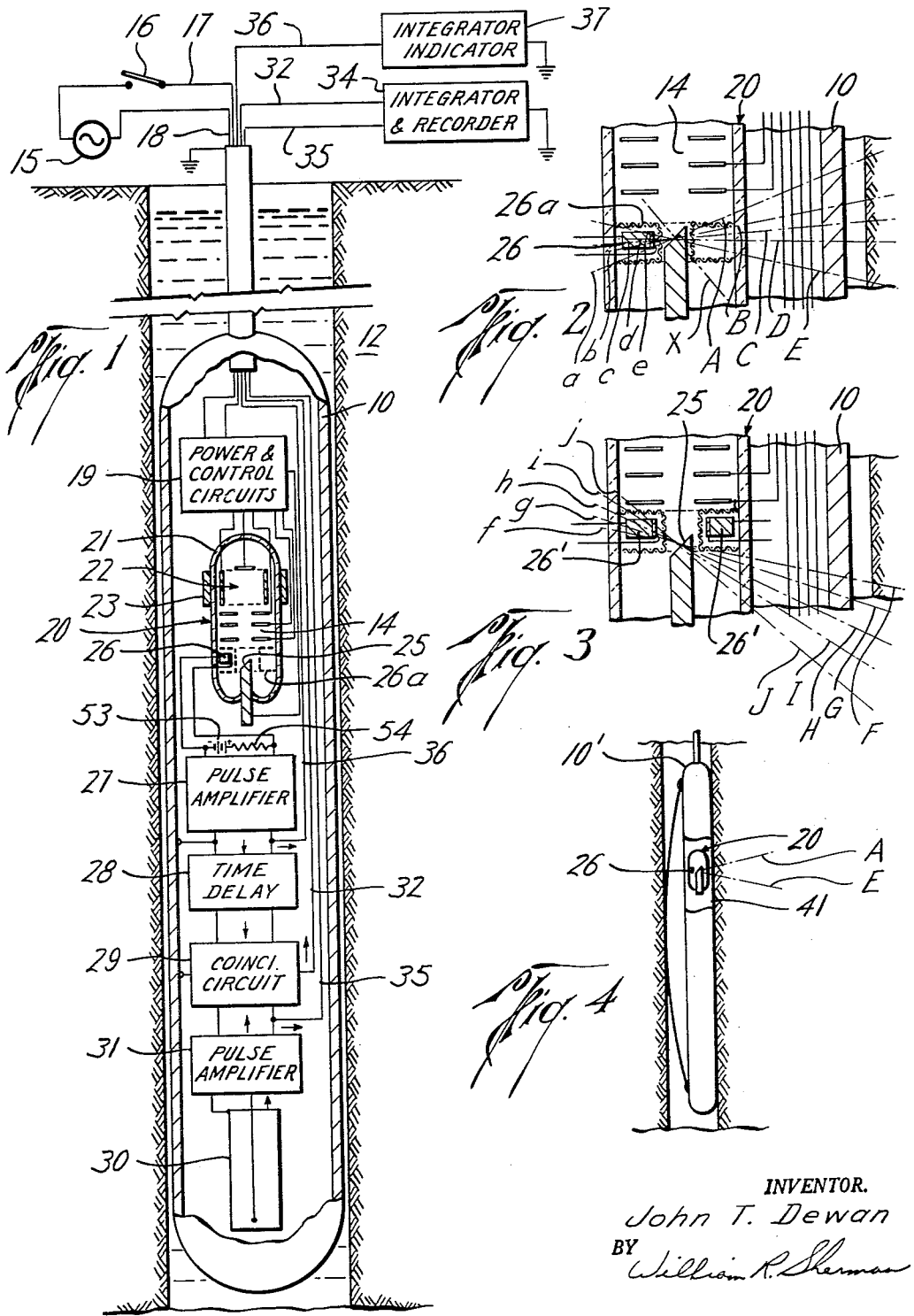

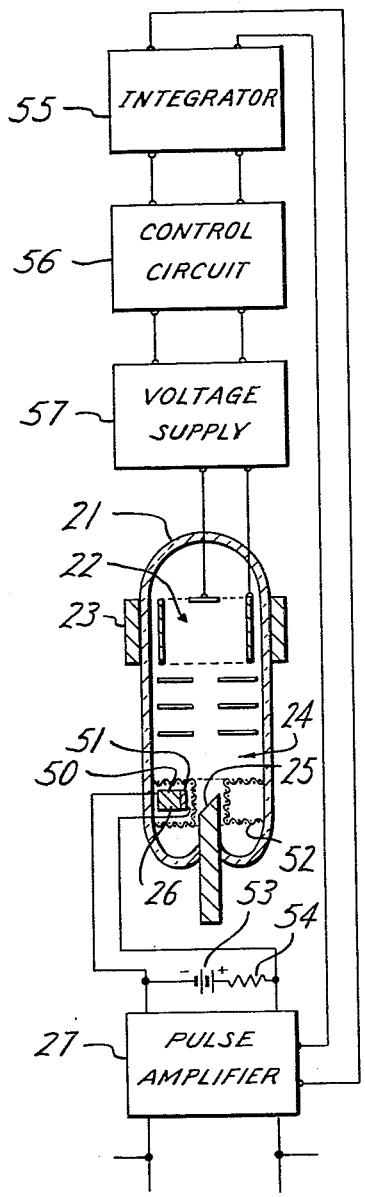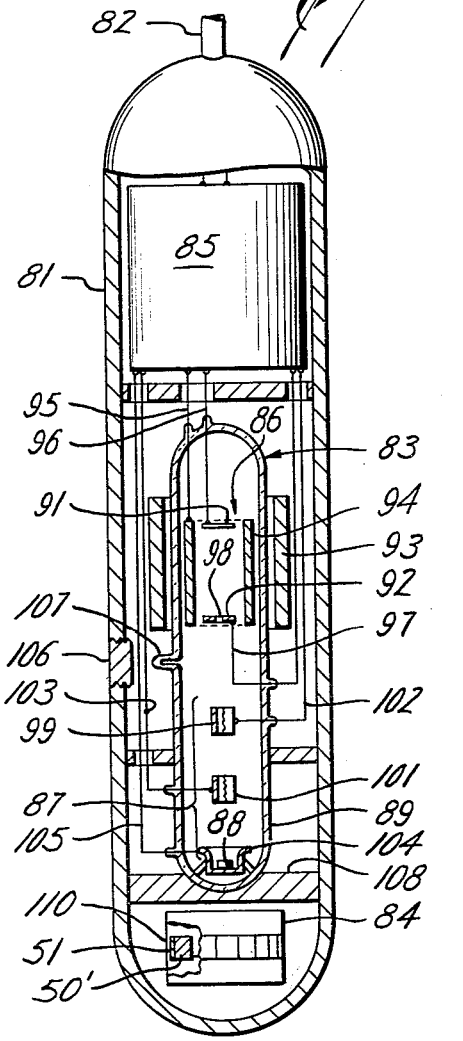

3,158,743
SEMICONDUCTOR JUNCTION DEVICE FOR MONI-
TORING RADIOACTIVITY IN A WELL LOGGING
SONDE
John T. Dewan, Houston, Tex., assignor to Schlumberger
Well Surveying Corporation, Houston, Tex., a corpo-
ration of Texas
Filed Feb. 23, 1961, Ser. No. 91,240
2 Claims. (Cl. 250—83.3)

This invention relates to systems for investigating earth formations traversed by a borehole and, more particularly, pertains to certain improvements in radioactivity logging apparatus of the type including a source of radiant energy adapted to be passed through the borehole and means for obtaining indications of resultant radiant energy caused by irradiation of the earth formations by the source and is a continuation-in-part of my copending application Serial No. 281,378, filed April 9, 1952, now U.S. Patent No. 2,973,444, issued February 28, 1961, and assigned to the present assignee.

As described in that application, a source of radiant energy, specifically neutrons, suitable for use in a well may comprise an ion source, an ion accelerator and a target that includes a substance adapted to react with bombarding ions of sufficient velocity to produce neu-trons. The source, accelerator and target are all con-tained within an envelope filled with ionizable gas at a pressure such that the mean free path of the ions is of the order of the spacing between the ion source and the target. In the preferred embodiment the ionizable gas is deuterium and the substance in the target is tritium. The gas pressure is chosen sufficiently high to provide an ade-quate number of ions with which to bombard the target and at the same time low enough to prevent the gas mole-cules from appreciably retarding the ion beam.

Earth formations have been logged heretofore using such a source of neutrons and a detector of radiant energy resulting from irradiation of the formations by neutrons. Since neutrons carry no electrical charge and are rela-tively highly penetrative, neutrons emitted from within the relatively confined space of a borehole cannot be readily influenced so as to permit the investigation of a limited zone of the formations. Were this possible, bore-hole size effects may be reduced, resolution of the meas-ured parameter may be increased and the depth of inves-tigation may be increased. In my Patent No. 2,958,780, issued November 1, 1960, there are disclosed systems em-ploying a monitoring detector providing signals in timed relation to the emission of neutrons generated by a suit-able source, such as one of the type described in the afore-said application. Because of space limitations within an appropriate borehole instrument, however, it would be desirable to employ for this purpose a radiant energy de-tector of minimum dimensions as well as one requiring only a minimum of electrical circuitry for its effective operation. Similar considerations are applicable to the detector used for measuring radiation returning from be-yond the wall of the well.

It is, therefore, an object of the present invention to provide new and improved apparatus for investigating materials adjacent a well by irradiation with radiant energy for effectively examining properties of these other-wise inaccessible materials.

Another object of the present invention is to provide new and improved radioactivity well logging apparatus providing indications substantially only in response to irra-diation of a particular character emanating from forma-tion regions of interest.

It is a further object of the present invention to provide new and improved radiant energy detecting systems useful in attaining the foregoing objects.

In accordance with the present invention, the materials traversed by a well bore are investigated by lowering therein a source of radiant energy of one type, preferably a source wherein quanta of such radiant energy are emitted in fixed time relation to emission of quantum of radiant energy of another type. Radiant energy of the one type irradiates the earth formations to produce result-ant radiant energy. Indications are obtained substan-tially only in response to quanta of the desired resultant radiant energy, for example, quanta having a predeter-mined timing relation to individual quanta of radiant energy of the other type.

For such purposes, the present invention comprehends apparatus for investigating earth formations traversed by a borehole comprising a support adapted to be passed through the borehole. A source of radiant energy of one type is carried by the support and irradiates the earth formations to produce resultant radiant energy. Each quantum of radiant energy of the one type emitted by the source may be accompanied by the emission of a quantum of radiant energy of another type. Radiant energy re-sponsive means carried by the support provides one signal in response to the resultant radiant energy and may also provide another signal in response to radiant energy of the other type. The apparatus further comprises means cou-pled to the radiant energy responsive means for utilizing the aforesaid signals to derive indications representing quanta of resultant radiant energy of prescribed character, for example, having a predetermined timing relation to individual quanta of radiant energy of the other type.

This invention further contemplates the use of a radiant energy detector comprising a semiconductor suitable for mounting in close proximity to or within the source of radiant energy to provide signals in response to radiant energy of the desired type.

The novel features of the present invention are set forth with particularity in the appended claims. The present invention, both as to its organization and manner of op-eration, together with further objects and advantages thereof, may best be understood by reference to the fol-lowing description taken in conjunction with the accom-panying drawings in which:

FIG. 1 is a view in longitudinal cross section of appa-ratus constructed in accordance with the present inven-tion for investigating earth formations (shown in section) traversed by a well bore;

FIG. 2 is an enlarged representation of a portion of the apparatus illustrated in FIG. 1;

FIG. 3 is a view similar to that shown in FIG. 2, but illustrates a modification which may be made to the apparatus there shown;

FIG. 4 is an elevational view, partially in cross section, illustrating a modification which may be made to the apparatus shown in FIG. 1;

FIG. 5 is an enlarged schematic representation of a modificaiton of a portion of the apparatus illustrated in FIG. 1; and FIG. 6 is an elevational view, partly in longitudinal section, illustrating another embodiment of the invention.

As shown in FIG. 1 of the drawings, apparatus em-bodying the present invention comprises a pressure re-sistant housing 10 adapted to pass through a borehole 11 traversing earth formations 12. Borehole 11 usually contains hydrogenous drilling fluid 13, such as a water base or oil base mud, or it may be dry.

Housing 10 is suspended in the borehole by means of an armoured cable 14 which, in connection with a winch (not shown) located at the surface of the earth, may be employed to lower and raise the housing in the borehole in a customary manner.

A source of electrical energy 15 at the surface of the earth is provided with an operating switch 16 and is con-nected by electrically insulated conductors 17 and 18 of cable 14 to power and control circuits 19 within housing 10 operatively connected to a neutron source 20 also supported within the housing. Source 20 may be constructed in any of a variety of ways, and, for example, may be similar to the devices disclosed in either of copending applications Serial No. 275,932, filed March 11, 1952, in the name of Clark Goodman, or Serial No. 281,378, filed April 9, 1952, in the name of J. T. Dewan, or of Patent No. 2,914,677, granted November 24, 1959, to W. R. Arnold, deceased. In accordance with the Arnold patent, neutron source 20 comprises a sealed envelope 21 filled with an ionizable gas, such as an isotope of hydrogen known as deuterium. Envelope 21 encloses electrodes of an ion source 22 energized by power circuit 19 and the envelope is encircled by a cylindrical magnet 23 operatively associated with the electrodes. Deuterium ions derived by source 22 pass into an accelerating gap 24 energized by power circuit 19 and are thus accelerated toward a target 25 loaded or impacted with another isotope of hydrogen known as tritium. Thus, through the resulting nuclear reactions, neutrons at an energy of 14 million electron volts (m.e.v.) are derived. If, however, neutrons at approximately 3.5 m.e.v. are desired, target 25 may be provided with deuterium instead of tritium.

As is well known, in the reaction between accelerated deuterium ions and tritium at target 25, for each fast neutron produced there is an alpha particle ($He^4$ nucleus) also produced. This particle recoils in the opposite direction to the direction of travel of the neutron. Some of these alpha particles are intercepted by one or more radiant energy detectors 26 supported within envelope 21 and preferably within an annular shielding cage 26a about target 25 and symmetrically positioned relative to a horizontal plane lying in the center of the upper surface of target 25 at which the aforesaid nuclear reactions occur. Detector 26 may, for example, be of a semi-conductor or solid-state type, described hereafter, providing output pulses supplied to a pulse amplifier 27, in turn, coupled to a time delay network 28. The delay network introduces a predetermined time delay selected in a manner to be apparent from a discussion to follow and it is coupled to one input of a conventional coincidence circuit 29.

Neutrons from source 20 irradiate earth formations 12 and may produce resultant radiant energy, for example, in the form of gamma rays as a result of inelastic scattering of fast neutrons or the capture of neutrons which have been slowed to low energies. Some of this gamma radiation impinges upon another radiant energy detector 30 supported within housing 10 at its lower end. Detector 30 may, for example, be a conventional Geiger counter and it is coupled to a pulse amplifier 31 which feeds another input circuit of coincidence circuit 29. The output circuit of coincidence circuit 29 is connected to an insulated conductor 32 of cable 14 and to housing 10 which is connected to shield 33 of the cable. An integrator and recorder unit 34 located at the surface of the earth is connected to conductor 32 and by appropriate grounds to shield 33. Unit 34 may, for example, comprise a capacitor for deriving a potential representing the number of incoming pulses per unit time and a recording voltmeter to which this potential is applied. The recording medium in the voltmeter is displaced in proportion to movement of housing 10 through the borehole 11 so that a continuous log may be obtained in a customary manner.

The output of pulse amplifier 31 is supplied via an insulated conductor 35 of cable 14 and appropriate ground connections to another portion of integrator and recorder unit 34, while the output of amplifier 27 is coupled via insulated conductor 36 and ground connections to an integrator-indicator 37 at the surface of the earth.

In operation, housing 10 is passed through borehole 11 with switch 16 closed and source 20 is energized so that nuclear reactions are established in the borehole at target 25 to provide radiant energy of one type, namely neutrons. The emission of each quantum of such radiant energy, i.e., each neutron, is accompanied by the emission of a quantum of radiant energy of another type. Specifically, each neutron is accompanied by the emission of an alpha particle traveling in the opposite direction. Neutrons having trajectories in a vertical plane such as the ones designated A, B, C, D, and E (FIG. 2) travel from target 25, pass through envelope 21 and housing 10 and enter earth formations 12. For each such neutron, a corresponding alpha particle passes along a respective one of opposite trajectories $a$, $b$, $c$, $d$, and $e$ respectively colinear with A, B, C, D, and E.

As can be seen, alpha particles on these trajectories $a$, $b$, $c$, $d$, and $e$ are incident on detector 26. Neutrons in the vertical plane represented in FIG. 2, lying outside of the boundaries designated by trajectories A and E, are accompanied by alpha particles which are not incident on detector 26. For example, a neutron along trajectory X has a corresponding alpha particle on path $x$ which does not pass into the detector. Obviously, assuming cylindrical symmetry of detector 26, the conditions depicted in FIG. 2 relative to a vertical plane are also representative of the occurrences in a horizontal plane through the upper surface of target 25.

A neutron leaving target 25, for example along trajectory C, enters earth formations 12 and may be either inelastically scattered or slowed and captured to produce a gamma ray quantum. Such a quantum of gamma radiation may impinge upon detector 30 producing a pulse which after amplification in amplifier 31 is applied to coincidence circuit 29. At the same time the neutron, just discussed, leaves target 25, an alpha particle on trajectory $c$ passes into detector 26 and a correspondingly timed pulse is generated and fed to amplifier 27. After amplification, this pulse is applied to time delay circuit 28 which is adjusted to provide a predetermined time delay such that the delayed pulse enters coincidence circuit 29 at the same time the pulse due to the gamma ray quantum arrives. Under such a condition of coincidence, a pulse is supplied by circuit 29 to integrator and recorder unit 34 at the surface of the earth.

It is evident that since the coincidence circuit supplied pulses only in response to coincidences of the type just described, the pulses at lead 32 are representative of gamma ray quanta due to neutrons having trajectories within the conical zone defined by the trajectories A and E in FIG. 2. From these pulses a voltage is derived having an amplitude representing the time of occurrence thereof and a recording is made of this voltage in a continuous fashion as the housing 10 passes through the borehole.

It is therefore evident that by accepting only coincident events, a log is obtained of the effects due to neutrons which have left target 25 in a direction opposite to the alpha detector 26. This is similar in effect to providing a directional neutron source.

Coincidence circuit 29 may be set to provide a coincidence resolving time longer than the neutron slowing down and capture time in formations 12, and this may be of the order of several hundred microseconds. Of course, time delay device 28 may be arranged so that it is continuously adjustable so that it may be adjusted empirically to achieve a desired mode of operation.

Since pulses from amplifier 31 are also fed to the integrator and recording unit 34, an additional log is made of essentially all the gamma radiation incident on detector 30. This, of course, is representative of neutron irradiation of the formations 12 without the directional effects described above. Accordingly, such record provides an indication of hydrogen content of the formations in a known manner.

Pulses from amplifier 27 are supplied to unit 37 which derives a voltage representing the time rate of occurrence of such pulses. This voltage may be displayed directly on a meter thereby providing a constant visual monitor for the alpha particle output of source 20. Thus, indications are provided which are representative of neutron flux emitted by the source 20. If desired, a recorder may be employed, or the voltage developed may be supplied to the recorder of unit 34 so that a continuous record of the neutron flux may be obtained as housing 10 passes through borehole 11.

From the foregoing discussion, it is evident that the pulse output of the coincidence circuit 29 is representative of neutrons which pass horizontally into the formation through a minimum of borehole fluid 13. Alternatively, the apparatus may be arranged as shown in FIG. 3 so that the neutrons in a zone of interest pass in a slightly downwardly-directed beam. Accordingly, an annular array of detectors 26′ connected in parallel is disposed about target 25 but is slightly above it so that neutrons which pass along trajectories such as the ones designated F–J are accompanied by alpha particles extending along trajectories f–j to define a given annular zone about the borehole. This zone defines an annular beam of neutron radiation directed at an acute angle to the longitudinal axis of the borehole and diverging from the target 25.

In the embodiment of the invention illustrated in FIG. 4, housing 10′ is provided with a bowed spring 40 for urging a portion or face 41 of the housing into relatively close association with the sidewall of borehole 11. Radiant energy detector 30 preferably is disposed in the housing closely adjacent to the inner surface of face 41 while alpha particle detector 26 is disposed within the envelope substantially at the level of neutron source and to one side thereof opposite portion 41 of the housing 10′. In this way, neutrons emanating from source 20 within the cone defined by trajectories A–E pass directly into earth formations 12 and are substantially unaffected by the drilling liquid 13. Thus, borehole size effects are minimized.

Although detector 30 has been described as being responsive to incident gamma radiation, it may be arranged in a known manner to respond either to fast or slow neutrons. Moreover, it may be any of a variety of types other than a Geiger-Mueller counter. For example, it may be either a proportional or scintillation counter arranged to respond to the desired radiant energy.

Obviously, pulse amplifier 31 may be followed by a conventional pulse-height discriminator and/or additional stages of amplification as may be required.

In accordance with the present invention, the detector 26 illustrated in FIG. 1 and in greater detail in FIG. 5, may comprise a solid-state semiconductor operated as a p-n junction with reverse bias. In this detector, a slab of p-type silicon 50 is subject to shallow diffusion of phosphorus from one end thereof to provide a thin layer of n-type silicon 51 to obtain a diffused p-n junction 52 in the depletion region. A reverse bias source 53 in series with a resistor 54 is connected across the terminals semiconductor detector 26 (as well as the input terminals of amplifier 27). Because of its small size, detector 26 can be internally mounted, singly or in an annular array within screening cage 26a, with the sensitive end 51 toward target 25 inside envelope 21.

The pulses produced by alpha particles incident upon detector 26 are fed to pulse amplifier 27 and thence to the coincident circuit (shown in FIG. 1) and also to an automatic control monitoring circuit including integrator 55 and control circuit 56 which controls the voltage supply 57 to the ion source 22 so that the neutron output may be regulated. It is obvious that the high voltage supply (of circuit 19) could also be controlled by the control circuit 56. In the embodiment shown, the circuits operate to keep the rate of alpha particle detection constant, thereby to keep the neutron output also constant.

It may be noted that diffused junction 52 should be in a plane normal to the stream of particles to be detected. This insures maximum detection of the alpha particles from the target and minimizes any effect from other radiation in the borehole.

The most accurate directional results will be provided at low neutron outputs; hence, it is desirable to keep the neutron output at a level of approximately $10^6$ neutrons or even less. This assures that most of the gamma rays being detected are those caused by the neutrons emitted in the same reaction as the alpha particles. The neutron monitor is used to assure that the desired neutron output is being obtained.

Referring to FIG. 6, there is shown a cylindrical pressure-resistant housing 81 supported by an electrical cable 82 and containing a source 83 of neutrons, a radioactive radiation detector 84 and electronic equipment 85 including a high-voltage power supply. The neutron source 83 comprises an ion source 86, an ion beam accelerator 87 and a target 88 contained within an envelope 89 and filled with an ionizable gas at a very low pressure, preferably deuterium mixed with an equal quantity of tritium at a pressure in the order of $10^{-3}$ millimeters of mercury.

The ion source 86 takes the form of a Philips ionization gauge, the theory of which is fully described in "Vacuum Equipment and Techniques" by Guthrie and Wakerling (McGraw-Hill, 1949) on pages 128–137. The ion source 86 comprises a pair of disc-shaped cathode electrodes 91 and 92 spaced apart along the axis of a magnetic field formed by a permanent magnet 93 mounted outside the envelope 89. A hollow cylindrical anode electrode 94 is disposed substantially coaxially with the magnetic axis between the two cathode electrodes 91 and 92 and preferably extends substantially the full distance therebetween. The anode electrode 94 is maintained at a moderate positive potential, say 500 volts, with respect to the cathode electrodes 91 and 92 by means of a conductor 95 connected with the power supply in the electronic equipment 85. The cathode electrodes 91 and 92 are connected to the power supply by means of conductors 96 and 97, respectively. The electrode 92 is preferably maintained at a somewhat greater negative potential, say 10 volts more, than the potential on the electrode 91 and has an aperture 98 therein through which positive ions may project toward the accelerator 87.

In the operation of the ion source 86 a free electron near the cathode electrode 91 tends to be accelerated toward the anode electrode 94 under the action of the electric field therebetween. However, the axial magnetic field deflects the electron and causes it to move in a tight helix having an axis parallel to the direction of the magnetic field. Accordingly, the electron does not reach the anode electrode 94 but approaches the opposite cathode electrode 92 where its direction is reversed and its returns toward the first cathode electrode 91 where it undergoes a further reversal. This oscillation causes the path of the electron to be many times longer than the interelectrode spacing and affords the electron an opportunity to ionize gas molecules even when the gas pressure is so low that the main free path of the electron is very long. The aperture 98 in the cathode electrode 92 permits many of the positively charged ions, which in the case of deuterium gas are termed deuterons, to pass out of the ion source 86.

The ion beam accelerator 87 in the path of the ion beam emerging from the ion source 86 may take the form of one or more cylindrical electrodes 99 and 101 maitained at progressively higher negative potentials in the direction of travel of the beam by conductors 102 and 103, respectively, connected to the power supply in the equipment 85. The electrodes 99 and 101 likewise serve to focus the ion beam upon the target 89. The final electrode of the ion beam accelerator 87 is a cathode electrode 104, which is illustrated as of cup-like shape facing the aperture 98 in the cathode electrode 92. The potential applied to the electrode 104 by a conductor 105 from the power supply is negative, say in the range from 20 to 100 kilovolts, with respect to the cathode electrode 92.

The target 88 is mounted in the electrode 104, which may be from a foot to several feet from the cathode electrode 22 when the pressure is on the order of $10^{-4}$ millimeters of mercury of say, 1.2 inches with $10^{-3}$ millimeters of mercury. It is necessary that the spacing between the ion source 86 and the target 88 should not substantially exceed the mean free path of the ions in order to avoid excessive retardation of the ion beam. The mean free paths are approximately five feet and six inches at pressures of $10^{-4}$ and $10^{-3}$ millimeters of mercury, respectively. The target 88 contains a substance adapted to react with the impinging ions to produce neutrons and preferably contains tritium to react with bombarding deuterons. For example, the target 88 may comprise a tungsten disk coated with zirconium impregnated with tritium or, alternatively, a copper surface coated with graphite, such as aquadag, impacted with tritium from the ion source.

The reaction of the accelerated deuterons on the tritium yields substantially monoenergetic neutrons having energies of approximately 14 million electrons volts. The reaction resulting from deuteron particles bombarding a trituim-bearing target is preferable, but other reactions producing neutrons may be employed. For example, deuteron particles bombarding a deuterium-bearing target will produce substantially monoenergetic neutrons at approximately 2.5 million electron volts. The neutron flux intensity, however, is lower than in the preferred reaction with the same ion current and accelerating voltage.

The neutron flux intensity is dependent upon the numbers of deuterons in the bombarding beam and may be increased also by increasing the negative potential on the cathode electrode 104.

Since the ion source 86, when energized, uses up the gas molecules in the envelope 89 and unwanted gas may leak in, the envelope 89 may occasionally be re-evacuated and refilled with the desired gas at the appropriate pressure. For this purpose a plug 106 is provided in the housing 81 opposite a nipple valve 107 in the envelope 89. In order to prevent depletion of an appreciable proportion of the gas molecules during a single logging run in a borehole, the volume of the gas is preferably as large as possible. The greater the gas volume the more gradual will be the increase in the gas pressure and the resulting retardation of the ion beam caused by a leak in the envelope.

According to the present invention, detector 84 may comprise a circular array of semiconductors 50, each like that of FIG. 5 but having a neutron reactive coating 110 comprising, for example, boron-10 on the outwardly directed face of the n-type silicon layer 51, so as to render the detector selectively sensitive to slow neutrons returning from the surrounding formations, and relatively insensitive to fast neutrons from the adjacent source 83.

The neutrons source 83 is quiescent at all times except when the housing 81 is within a borehole opposite earth formations which the operator desires to log. At such time the electronic equipment 85 is energized by an alternating current power source (not shown) outside the borehole. The apparatus may then be employed in accordance with the logging methods disclosed by Clark Goodman in copending application Serial No. 275,932, entitled "Neutron Well Logging," and filed March 11, 1952. A shield 108 is located between the target 88 and the radioactive radiation detector 84. The soft beta emission associated with the decay of tritium is easily absorbed by the housing 81.

While particular embodiments of the present invention have been shown and described, it is apparent that changes and modifications may be made without departing from this invention in its broader aspects, and therefore the aim in the appended claims is to cover all such changes and modifications as fall within the true spirit and scope of this invention.

I claim:

1. Radioactivity well logging apparatus comprising a pressure resistant housing adapted to be lowered through a well bore, a radiant energy detector in said housing comprising a junction-type semiconductor elongated in a direction transverse to its junction, means for supporting said semiconductor with its elongated dimension extending radially of said housing so as to be primarily sensitive to radiant energy directed radially with respect to the well bore, and means coupled with said detector for deriving indications primarily representative of radiant energy incident upon said semiconductor in said radial direction.

2. Radioactivity well logging apparatus comprising a pressure resistant housing adapted to be lowered through a well bore, said housing containing a sealed deuterium-tritium neutron source including an ion source and a target coaxially spaced by an accelerating gap, a radiant energy detector in said housing, said detector comprising a junction-type semiconductor elongated in a direction transverse to its junction, means for supporting said semiconductor in a position spaced in a radial direction from the axis of said neutron source with its elongated direction transverse to the axis of said neutron source, and means coupled with said detector for deriving indications primarily representative of radiant energy incident upon said semiconductor in said radial direction.

References Cited in the file of this patent

UNITED STATES PATENTS

| | | |
|---|---|---|
| 2,670,441 | McKay | Feb. 23, 1954 |
| 2,753,462 | Moyer et al. | July 3, 1956 |
| 2,760,078 | Youmans | Aug. 21, 1956 |
| 2,885,562 | Marinace | May 5, 1959 |
| 2,988,639 | Welker et al. | June 13, 1961 |
| 2,991,366 | Salzberg | July 4, 1961 |
| 2,994,776 | Mott | Aug. 1, 1961 |
| 3,043,955 | Friedland et al. | July 10, 1962 |

OTHER REFERENCES

Armstrong: Transistorized Logging Probe, Nucleonics, October 1957; pages 100–106.

Jones: Uses of Semiconductor Detectors in Health Physics Monitoring, Nuclenoics, October 1960; pages 86–91.